US012630723B2

(12) United States Patent
Huang et al.

(10) Patent No.: US 12,630,723 B2
(45) Date of Patent: May 19, 2026

(54) HYBRID EXPANDABLE COMPOSITION AND USE THEREOF

(71) Applicant: HENKEL AG & CO., KGaA, Duesseldorf (DE)

(72) Inventors: Tianjian Huang, Hillsborough, NJ (US); Kristina Thompson, Clinton, NJ (US)

(73) Assignee: HENKEL AG & CO. KGaA, Duesseldorf (DE)

( * ) Notice: Subject to any disclaimer, the term of this patent is extended or adjusted under 35 U.S.C. 154(b) by 699 days.

(21) Appl. No.: 18/067,856

(22) Filed: Dec. 19, 2022

(65) Prior Publication Data

US 2023/0119653 A1 Apr. 20, 2023

Related U.S. Application Data

(63) Continuation of application No. PCT/US2021/037215, filed on Jun. 14, 2021.

(60) Provisional application No. 63/042,168, filed on Jun. 22, 2020.

(51) Int. Cl.
| | |
|---|---|
| *C09D 5/02* | (2006.01) |
| *B65D 65/42* | (2006.01) |
| *C09D 7/40* | (2018.01) |
| *C09D 7/61* | (2018.01) |
| *C09D 7/65* | (2018.01) |

(52) U.S. Cl.
CPC ............. *C09D 5/022* (2013.01); *B65D 65/42* (2013.01); *C09D 5/024* (2013.01); *C09D 7/61* (2018.01); *C09D 7/65* (2018.01); *C09D 7/70* (2018.01)

(58) Field of Classification Search
None
See application file for complete search history.

(56) References Cited

U.S. PATENT DOCUMENTS

| | | | |
|---|---|---|---|
| 2,147,689 | A | 2/1939 | Chaffee |
| 2,998,501 | A | 8/1961 | Edberg et al. |
| 3,152,749 | A | 10/1964 | Young |
| 3,252,064 | A | 5/1966 | Duncan |
| 3,253,064 | A | 5/1966 | Buonaiuto |
| 3,300,360 | A | 1/1967 | Williams et al. |
| 3,342,613 | A | 9/1967 | Schelhorn |
| 3,401,475 | A | 9/1968 | Morehouse et al. |
| 3,563,851 | A | 2/1971 | Walter et al. |
| 3,583,851 | A | 6/1971 | Ernest et al. |
| 3,615,972 | A | 10/1971 | Donald et al. |
| 3,732,975 | A | 5/1973 | Poncy |

(Continued)

FOREIGN PATENT DOCUMENTS

| | | |
|---|---|---|
| CA | 2078476 A1 | 3/1993 |
| CA | 2145938 A1 | 10/1995 |

(Continued)

OTHER PUBLICATIONS

Yao, Zhiguang et al., Polymer Chemistry, Jan. 2013, p. 212.

(Continued)

*Primary Examiner* — Yan Lan
(74) *Attorney, Agent, or Firm* — Sun Hee Thomas

(57) ABSTRACT

A hybrid expandable composition that provides improved expansion and loft properties is disclosed. The hybrid expandable composition is particularly useful in providing insulation and/or cushion to substrates.

19 Claims, 4 Drawing Sheets

(56) References Cited

U.S. PATENT DOCUMENTS

| | | | |
|---|---|---|---|
| 3,904,429 A | 9/1975 | Eastman et al. | |
| 4,005,033 A | 1/1977 | Georgeau et al. | |
| 4,006,273 A | 2/1977 | Wolinski et al. | |
| 4,038,762 A | 8/1977 | Swan | |
| 4,087,002 A | 5/1978 | Bambara et al. | |
| 4,094,685 A | 6/1978 | Lester et al. | |
| 4,179,546 A * | 12/1979 | Garner | C08J 9/228 |
| | | | 521/56 |
| 4,193,499 A | 3/1980 | Lookholder | |
| 4,350,788 A | 9/1982 | Shimokawa et al. | |
| 4,483,889 A | 11/1984 | Andersson | |
| 4,531,038 A | 7/1985 | Lillibridge et al. | |
| 4,661,401 A | 4/1987 | Akao | |
| 4,690,843 A | 9/1987 | Inagaki | |
| 4,708,896 A | 11/1987 | Akao | |
| 4,720,410 A | 1/1988 | Lundquist et al. | |
| 4,900,594 A | 2/1990 | Quick et al. | |
| 4,925,711 A | 5/1990 | Akao et al. | |
| 5,030,302 A | 7/1991 | Jud et al. | |
| 5,082,744 A | 1/1992 | Akao et al. | |
| 5,100,721 A | 3/1992 | Akao | |
| 5,114,509 A | 5/1992 | Johnston et al. | |
| 5,236,977 A | 8/1993 | Eden et al. | |
| 5,264,467 A | 11/1993 | Distefano | |
| 5,277,737 A | 1/1994 | Li et al. | |
| 5,288,765 A | 2/1994 | Bastioli et al. | |
| 5,325,781 A | 7/1994 | Dupont et al. | |
| 5,342,467 A | 8/1994 | Corey | |
| 5,356,683 A | 10/1994 | Egolf et al. | |
| 5,387,626 A | 2/1995 | Boehme-Kovac et al. | |
| 5,393,336 A | 2/1995 | Foran et al. | |
| 5,415,339 A | 5/1995 | Howard | |
| 5,451,437 A | 9/1995 | Insley et al. | |
| 5,542,599 A | 8/1996 | Sobol | |
| 5,612,385 A | 3/1997 | Ceaser et al. | |
| 5,636,493 A | 6/1997 | Weder | |
| 5,685,480 A | 11/1997 | Choi | |
| 5,759,624 A | 6/1998 | Neale et al. | |
| 5,881,883 A | 3/1999 | Siegelman | |
| 5,928,741 A | 7/1999 | Andersen et al. | |
| 6,139,961 A | 10/2000 | Blankenship et al. | |
| 6,231,970 B1 | 5/2001 | Andersen et al. | |
| 6,255,369 B1 | 7/2001 | Philbin et al. | |
| 6,312,713 B1 | 11/2001 | Korol et al. | |
| 6,352,769 B1 | 3/2002 | Mori | |
| 6,379,497 B1 | 4/2002 | Sandstrom et al. | |
| 6,648,955 B1 | 11/2003 | Swiezkowski et al. | |
| 6,740,373 B1 | 5/2004 | Swoboda et al. | |
| 6,740,706 B2 | 5/2004 | Ohrbom et al. | |
| 6,749,705 B2 | 6/2004 | Skrzyniarz et al. | |
| 6,838,187 B2 | 1/2005 | Figiel et al. | |
| 6,951,677 B2 | 10/2005 | Ishikawa et al. | |
| 7,335,279 B2 | 2/2008 | Mohan et al. | |
| 7,718,751 B2 | 5/2010 | Orpin | |
| 7,799,968 B2 | 9/2010 | Chen et al. | |
| 8,529,723 B2 | 9/2013 | Fu et al. | |
| 8,568,029 B2 | 10/2013 | Kannankeril et al. | |
| 8,568,283 B2 | 10/2013 | Broering et al. | |
| 8,574,698 B2 | 11/2013 | Fung et al. | |
| 8,747,603 B2 | 6/2014 | Huang et al. | |
| 9,056,712 B2 | 6/2015 | Cook et al. | |
| 9,260,633 B2 | 2/2016 | Hoa et al. | |
| 9,273,230 B2 | 3/2016 | Thompson et al. | |
| 9,522,772 B2 | 12/2016 | Fu et al. | |
| 9,580,228 B2 | 2/2017 | Fu et al. | |
| 9,580,629 B2 | 2/2017 | Huang et al. | |
| 9,591,937 B2 | 3/2017 | Fu et al. | |
| 9,648,969 B2 | 5/2017 | Fu et al. | |
| 9,657,200 B2 | 5/2017 | Thompson et al. | |
| 9,771,499 B2 | 9/2017 | Huang et al. | |
| 9,849,655 B2 | 12/2017 | Huang et al. | |
| 9,865,551 B2 | 1/2018 | Takano et al. | |
| 10,099,459 B2 | 10/2018 | Huang et al. | |
| 10,100,204 B2 | 10/2018 | Huang et al. | |
| 10,100,231 B2 | 10/2018 | Huang et al. | |
| 10,144,573 B2 | 12/2018 | Fu et al. | |
| 10,183,458 B2 | 1/2019 | Fu et al. | |
| 10,208,429 B2 | 2/2019 | Huang et al. | |
| 10,259,151 B2 | 4/2019 | Kiiskinen et al. | |
| 10,815,397 B2 | 10/2020 | Thompson et al. | |
| 11,104,497 B2 | 8/2021 | Lee et al. | |
| 11,193,048 B2 | 12/2021 | Thompson et al. | |
| 11,427,963 B2 | 8/2022 | Huang et al. | |
| 2001/0049007 A1 | 12/2001 | Jones | |
| 2002/0068139 A1 | 6/2002 | Polak et al. | |
| 2002/0071947 A1 | 6/2002 | Soane et al. | |
| 2002/0094403 A1 | 7/2002 | Ishikawa et al. | |
| 2002/0115785 A1 | 8/2002 | Weitzel et al. | |
| 2002/0182347 A1 | 12/2002 | Debraal et al. | |
| 2003/0003197 A1 | 1/2003 | Berlin et al. | |
| 2003/0034117 A1 | 2/2003 | Thomas et al. | |
| 2003/0091811 A1 | 5/2003 | Skrzyniarz et al. | |
| 2003/0211351 A1 | 11/2003 | Figiel et al. | |
| 2004/0005100 A1 | 1/2004 | Versluys | |
| 2004/0033343 A1 | 2/2004 | Comeau et al. | |
| 2004/0065424 A1 | 4/2004 | Mohan et al. | |
| 2004/0065539 A1 | 4/2004 | Sosnowski | |
| 2004/0191438 A1 | 9/2004 | Cosentino et al. | |
| 2005/0067095 A1 | 3/2005 | Hasenoehrl et al. | |
| 2005/0152624 A1 | 7/2005 | Versluys | |
| 2005/0163974 A1 | 7/2005 | Geeroms | |
| 2007/0009723 A1 | 1/2007 | Ogawa et al. | |
| 2007/0155859 A1 | 7/2007 | Song et al. | |
| 2007/0224395 A1 | 9/2007 | Rowitsch et al. | |
| 2007/0228134 A1 | 10/2007 | Cook et al. | |
| 2007/0287776 A1 | 12/2007 | Nordin et al. | |
| 2008/0017338 A1 | 1/2008 | Nordin et al. | |
| 2008/0055380 A1 | 3/2008 | Regan et al. | |
| 2008/0118693 A1 | 5/2008 | Bilski et al. | |
| 2009/0280322 A1 | 11/2009 | Daniels et al. | |
| 2009/0306255 A1 | 12/2009 | Patel et al. | |
| 2009/0321508 A1 | 12/2009 | Fu et al. | |
| 2010/0012712 A1 | 1/2010 | Swoboda et al. | |
| 2010/0068544 A1 | 3/2010 | Huang et al. | |
| 2010/0119741 A1 | 5/2010 | Cimecioglu et al. | |
| 2010/0136269 A1 | 6/2010 | Andersen et al. | |
| 2010/0139878 A1 | 6/2010 | Nicolucci | |
| 2010/0181015 A1 | 7/2010 | Kohler | |
| 2011/0019121 A1 | 1/2011 | Mo et al. | |
| 2011/0033398 A1 | 2/2011 | Cauvin et al. | |
| 2011/0064926 A1 | 3/2011 | Babinsky et al. | |
| 2011/0248076 A1 | 10/2011 | Bentmar et al. | |
| 2012/0015162 A1 | 1/2012 | Lion et al. | |
| 2012/0043373 A1 | 2/2012 | Babinsky et al. | |
| 2012/0048450 A1 | 3/2012 | Fu et al. | |
| 2012/0100289 A1 | 4/2012 | Egan et al. | |
| 2012/0285972 A1 | 11/2012 | Fu et al. | |
| 2013/0160945 A1 | 6/2013 | Huang et al. | |
| 2013/0303351 A1 | 11/2013 | Fu et al. | |
| 2014/0004563 A1 | 1/2014 | Paripati et al. | |
| 2014/0087109 A1 * | 3/2014 | Huang | D21H 21/54 |
| | | | 428/313.5 |
| 2014/0087177 A1 | 3/2014 | Thompson et al. | |
| 2014/0131367 A1 | 5/2014 | Bordary et al. | |
| 2014/0141185 A1 | 5/2014 | Thompson et al. | |
| 2014/0154492 A1 | 6/2014 | Traser et al. | |
| 2014/0243442 A1 | 8/2014 | Coles et al. | |
| 2015/0322301 A1 | 11/2015 | Ellis et al. | |
| 2016/0050722 A1 | 2/2016 | Fu et al. | |
| 2016/0194828 A1 | 7/2016 | Chang | |
| 2016/0221233 A1 | 8/2016 | Kiiskinen et al. | |
| 2016/0263876 A1 | 9/2016 | Huang et al. | |
| 2017/0130058 A1 | 5/2017 | Huang et al. | |
| 2017/0130399 A1 | 5/2017 | Huang et al. | |
| 2017/0341847 A1 | 11/2017 | Chase et al. | |
| 2017/0361573 A1 | 12/2017 | Malmgren et al. | |
| 2018/0072032 A1 | 3/2018 | Huang et al. | |
| 2018/0148246 A1 | 5/2018 | Fu et al. | |
| 2019/0031415 A1 | 1/2019 | Kumar | |
| 2019/0062028 A1 | 2/2019 | Getty et al. | |
| 2019/0106263 A1 | 4/2019 | Fu et al. | |
| 2019/0136456 A1 | 5/2019 | Huang et al. | |
| 2019/0152183 A1 | 5/2019 | Fu et al. | |
| 2019/0161915 A1 | 5/2019 | Swails et al. | |

(56) References Cited

U.S. PATENT DOCUMENTS

| | | | |
|---|---|---|---|
| 2019/0218419 A1 | 7/2019 | Mcleod et al. | |
| 2019/0218429 A1 | 7/2019 | Thompson et al. | |
| 2019/0218720 A1 | 7/2019 | Huang et al. | |
| 2019/0284438 A1 | 9/2019 | Mcleod et al. | |
| 2020/0247105 A1 | 8/2020 | Getty et al. | |
| 2021/0214581 A1 | 7/2021 | Mcleod et al. | |
| 2022/0073787 A1 | 3/2022 | Mcleod et al. | |

FOREIGN PATENT DOCUMENTS

| | | | |
|---|---|---|---|
| CN | 1354085 A | 6/2002 | |
| CN | 1449913 A | 10/2003 | |
| CN | 1643100 A | 7/2005 | |
| CN | 101263184 A | 9/2008 | |
| CN | 101476265 A | 7/2009 | |
| CN | 103079791 A | 5/2013 | |
| CN | 103189460 A | 7/2013 | |
| CN | 103717690 A | 4/2014 | |
| CN | 104685125 A | 6/2015 | |
| CN | 105765023 A | 7/2016 | |
| CN | 110892013 A | 3/2020 | |
| DE | 3685819 T2 | 1/1993 | |
| DE | 60107070 T2 | 11/2005 | |
| DE | 202011109020 U1 | 1/2012 | |
| EP | 0526396 A1 | 2/1993 | |
| EP | 0804331 A1 | 11/1997 | |
| EP | 0890625 A1 | 1/1999 | |
| EP | 1142801 A1 | 10/2001 | |
| EP | 1216146 B1 | 10/2005 | |
| EP | 1634897 A2 | 3/2006 | |
| EP | 1669490 A1 | 6/2006 | |
| EP | 1674543 A1 | 6/2006 | |
| EP | 1780250 A1 | 5/2007 | |
| EP | 2611588 A2 | 7/2013 | |
| EP | 2614124 A2 | 7/2013 | |
| EP | 3215674 A1 | 9/2017 | |
| GB | 1486328 A | 9/1977 | |
| GB | 2303630 A | 2/1997 | |
| IT | VE990023 A1 | 11/2000 | |
| JP | S5085483 A | 7/1975 | |
| JP | S6144965 A | 3/1986 | |
| JP | H05208597 A | 8/1993 | |
| JP | H05239423 A | 9/1993 | |
| JP | H06144965 A | 5/1994 | |
| JP | H06313163 A | 11/1994 | |
| JP | H08175576 A | 7/1996 | |
| JP | H09164621 A | 6/1997 | |
| JP | H09217050 A | 8/1997 | |
| JP | H10329297 A | 12/1998 | |
| JP | 2000006285 A | 1/2000 | |
| JP | 2000159268 A | 6/2000 | |
| JP | 2001191436 A | 7/2001 | |
| JP | 2001207146 A | 7/2001 | |
| JP | 2001323094 | * 11/2001 | |
| JP | 2001323094 A | 11/2001 | |
| JP | 2002241450 A | 8/2002 | |
| JP | 2003072854 A | 3/2003 | |
| JP | 2003154589 A | 5/2003 | |
| JP | 2004511616 A | 4/2004 | |
| JP | 2005097816 A | 4/2005 | |
| JP | 2006517238 A | 7/2006 | |
| JP | 3826772 B2 | 9/2006 | |
| JP | 2009179894 A | 8/2009 | |
| JP | 2010202996 A | 9/2010 | |
| JP | 2013067070 A | 4/2013 | |
| JP | 2014024583 A | 2/2014 | |
| JP | 2015524856 A | 8/2015 | |
| JP | 2015196773 A | 11/2015 | |
| JP | 2017039523 A | 2/2017 | |
| JP | 2020527635 A | 9/2020 | |
| KR | 20140090995 A | 7/2014 | |
| KR | 20160090800 A | 8/2016 | |
| KR | 20170065618 A | 6/2017 | |
| RU | 2216495 C2 | 11/2003 | |
| RU | 2252825 C2 | 5/2005 | |
| RU | 2011129597 A | 1/2013 | |
| RU | 2015135327 A | 3/2017 | |
| WO | 9014223 A1 | 11/1990 | |
| WO | 9633923 A1 | 10/1996 | |
| WO | 9854004 A1 | 12/1998 | |
| WO | 0069747 A1 | 11/2000 | |
| WO | 0110635 A2 | 2/2001 | |
| WO | 0154828 A1 | 8/2001 | |
| WO | 0154988 A2 | 8/2001 | |
| WO | 0162986 A1 | 8/2001 | |
| WO | 0200800 A2 | 1/2002 | |
| WO | 0231077 A2 | 4/2002 | |
| WO | 2005110737 A1 | 11/2005 | |
| WO | 2007091961 A1 | 8/2007 | |
| WO | 2007126783 A1 | 11/2007 | |
| WO | 2007135451 A1 | 11/2007 | |
| WO | 2007142593 A1 | 12/2007 | |
| WO | 2008084372 A1 | 7/2008 | |
| WO | 2010069451 A1 | 6/2010 | |
| WO | 2010129493 A1 | 11/2010 | |
| WO | 2012030596 A1 | 3/2012 | |
| WO | 2012033998 A2 | 3/2012 | |
| WO | 2013192572 A1 | 12/2013 | |
| WO | 2014015060 A2 | 1/2014 | |
| WO | 2014051876 A1 | 4/2014 | |
| WO | 2015036901 A1 | 3/2015 | |
| WO | 2015066806 A1 | 5/2015 | |
| WO | 2015081097 A1 | 6/2015 | |
| WO | 2016014486 A1 | 1/2016 | |
| WO | 2019018523 A1 | 1/2019 | |
| WO | 2019040624 A1 | 2/2019 | |

OTHER PUBLICATIONS

Resyn® 1072 Technical Data Sheet, Celanese , Apr. 15, 2022, 2 pages.

Industrial Pharmaceutics, Editor-in-chief: Rongfeng Hu, Beijing: China Press of Traditional Chinese Medicine, Aug. 2010, p. 396., China Press of Traditional Chinese Medicine.

https://www.vttresearch.com/en/ourservices/foam-forming-platform.

Skylighter, "Kraft Paper Weights and Thickness Comparison Chart", Feb. 14, 2018. (Year: 2018).

Bermesheva, EV "Zavisimost mezhdu vyazkoupru9imi I adgezivnymi svoistvami polimemykh adgezivov. Dopolneni kriteriya liplosti Dalkkuista", 25 Sipozium Po Reologii, G.Ostashkov, Sep. 5-10, 2010, pp. 61, 62.

https://cris.vtt.fi/en/publications/foam-forming-tech nology-enables-new-possibilities-for-paper-indus.

International Search Report and Written Opinion, International Application No. PCT/US2018/047526, dated Jan. 18, 2019.

Radio frequency (RF)vs, microwave (MW) (n.d.), Retrieved from https://www.stalam.com/eng/technology?and-benefits/rf-vs-microwaves.

European Search Results Under Rule 164(2)(b) EPC EP 18769557 Completed: May 27, 2021; Mailing Date: Jun. 2, 2021 7 Pages.

NXP, FTF 2016 Technology Forum, "Advantages of Solid State RF Power Over Vacuum Tubes in Industrial Applications", May 18, 2016. (Year: 2016).

Jiao, Shunshan et al., "Principles of Radio-Frequency and Micro-wave Heating", Radio-Frequency Heating in Food Processing, CRC Press, 2015, p. 4. Month of Publication Unknown. (Year: 2015).

Popil, Roman E. et al "Adhesive level effect on corrugated board strength—experiment and FE modeling." In: International progress in paper physics seminar. Oxford, Ohio: Miami University, 2006.

* cited by examiner

HYBRID EXPANDABLE COMPOSITION AND USE THEREOF

FIELD OF THE INVENTION

The present invention relates to hybrid expandable compositions that provide improved expansion and loft properties. In particular, the invention includes compositions and methods of making said compositions for use in providing insulation and/or cushioning to substrates.

BACKGROUND OF THE INVENTION

Biodegrade and/or compostable packages and containers are in demand. One such package includes cellulose-based substrates, sourced from renewable materials that can be recycled, composted and/or biodegraded. The package is made by joining two cellulosic substrates with plurality of air gaps interposed in between the two. Some drawbacks to these alternative packages include low insulation and poor structural integrity over the plastic packages. As the package is handled and flexed, the air gaps become compressed and the insulation is destroyed in those compressed areas. Various techniques are described in U.S. Pat. Nos. 9,580,629, 8,747,603, 9,273,230, 9,657,200, US 2014/0087109, US 2017/0130399, US 2017/0130058, US 2016/0263876, and WO2019/018523. Some techniques improve structural integrity by including additional or thicker substrates or by reinforcing the air gap insulations. Such additions increase the carbon footprint or increase cost to the overall package. There is a need in the art for effective insulation and structural integrity to produce environmentally and economically sound packages and containers.

SUMMARY OF THE INVENTION

The present invention relates to hybrid expandable compositions that provide improved expansion and loft properties.

In a first embodiment of the present invention, there is provided a hybrid expandable composition having improved insulative and cushioning properties, including a binder system, which is a mixture of (i) an emulsion polymer binder having a Tg range from about −40° C. to about 60° C. and (ii) a starch or dextrin; a plurality of pre-expanded or expandable microspheres; and water-soluble salt.

Another embodiment of the present invention provides a hybrid expandable composition, characterized as having closed cell structure and open cell structure, prepared from a hybrid expandable composition including from about 30 to about 80 wt % of a hybrid binder system mixture; about 1 to about 15 wt % of a plurality of microspheres; about 0.1 to about 5 wt % of a water-soluble salt; and up to about 5 % of an additive.

Still another embodiment of the invention provides a method of forming a hybrid expandable material, including the steps of preparing a hybrid expandable composition comprising (i) about 30 to about 80 wt % of a binder mixture system that is a mixture of (i) an emulsion polymer binder having a Tg range from about −40° C. to about 60° C. and (ii) a starch or dextrin; (ii) about 1 to about 15 wt % of a plurality of microspheres; (iii) about 0.1 to about 5 wt % of a water-soluble salt; and (vi) up to about 5 wt % of an additive; applying the hybrid expandable composition onto a substrate; subjecting the hybrid expandable composition to rapid heating; and cooling the hybrid expandable composition to set the hybrid expandable material.

DETAILED DESCRIPTION OF THE INVENTION

Figure 1A:
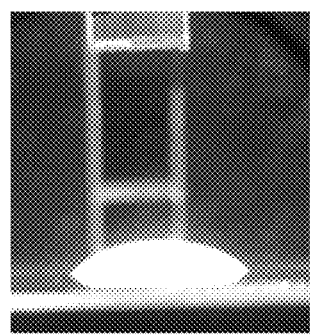
FIG. 1A is a side view photograph of unexpanded Sample 3.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present disclosure. All publications, patent applications, patents and other references mentioned herein are incorporated by reference in their entirety. The materials, methods, and examples disclosed herein are illustrative only and not intended to be limiting.

As used herein, the term "comprising" may include the embodiments "consisting of and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of and "consisting essentially of the enumerated ingredients/steps, which allows the presence of only the named ingredients/steps, along with any impurities that might result therefrom, and excludes other ingredients/steps.

Numerical values herein, particularly as they relate to polymers or polymer compositions, reflect average values for a composition that may contain individual polymers of different characteristics. Furthermore, unless indicated to the contrary, the numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 to 10" is inclusive of the endpoints, 2 and 10, and all the intermediate values). The endpoints of the ranges and any values disclosed herein are not limited to the precise range or value; they are sufficiently imprecise to include values approximating these ranges and/or values. As used herein, approximating language may be applied to modify any quantitative representation that may vary without resulting in a change in the basic function to which it is related. Accordingly, a value modified by a term or terms, such as "about," may not be limited to the precise value specified, in some cases. In at least some instances, the approximating language may correspond to the precision of an instrument for measuring the value. The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11", and "about 1" may mean from 0.9-1.1. Other meanings of "about" may be apparent from the context, such as rounding off, so, for example "about 1" may also mean from 0.5 to 1.4.

The present invention provides hybrid expandable compositions, and once expanded, provide insulative properties and structural integrity on which it is used. The hybrid expandable composition described herein may be useful on recyclable, compostable or biodegradable substrates. The hybrid expandable composition described herein requires less synthetic materials than conventional packages that require plastic bubble wraps to provide cushioning and insulation. The end result is a less expensive and more environmentally conscious product. The hybrid expandable composition useful herein include paper products for consumer use, such as for packages, containers, envelopes, boxes, and the like.

The present invention is based on the discovery that a hybrid expandable composition for use in preparing an insulative and protective product based on hybrid system of open and closed cell foams. When a combination of the open and closed cell foams is formed together, it provides structural integrity and protective insulative properties to the product with less carbon footprint. In addition, the hybrid foams allow the product to use thinner (lower basis weight) substrates, decreasing the carbon footprint even further.

In a first embodiment, the hybrid expandable composition includes a binder system that is a mixture of (i) an emulsion polymer binder having a Tg range from about −40° C. to about 60° C. and (ii) starch or dextrin; a plurality of pre-expanded or expandable microspheres; and water-soluble salt. The composition may further include one or more defoamer, plasticizer, preservative, surfactant, rheology modifier, filler, pigment, dye, stabilizer, polyvinyl alcohol, humectant, and mixtures thereof. Other materials that do not adversely affect the composition and insulation properties of the composition may be used as desired.

Various combination of (i) an emulsion polymer binder having a Tg range from about −40° C. to about 60° C. and (ii) starch or dextrin may be utilized to form this binder mixture; however, the binder must have a shear viscosity of more than 10 Pas measured at 25° C. at 0.1 s$^{-1}$ and a viscosity of about less than 2 Pas measured with Brookfield at 25° C. at 100 s$^{-1}$. This viscosity range allows the hybrid expandable composition to provide better shelf life and coat-ability.

The emulsion polymer may include any desired polymer components, including vinyl acetate ethylene dispersion, polyvinyl acetate, polyvinyl acetate polyvinyl alcohol, dextrin stabilized polyvinyl acetate, polyvinyl acetate copolymers, vinyl acetate ethylene copolymers, vinyl acrylic, styrene acrylic, acrylic, styrene butyl rubber, polyurethane, starch and mixtures thereof. Particularly preferred emulsion polymer components are vinyl acetate ethylene dispersion, and polyvinyl acetate and starch. Preferably, the emulsion polymer is stabilized by hydrophilic protective colloids. The emulsion polymer has a Tg range from about −40° C. to about 60° C.; preferably from about −40° C. to about 0° C.; and most preferably from about −35° C. to about −5° C.

The starch or dextrin component may be about 5 to about 30 wt %, based on the total weight of the hybrid expandable composition.

Dextrin is typically prepared by heating a starch in the presence of an acid under temperatures below 150° C., typically 30-40% suspension under mild hydrolysis condition (79-120° C. for three to eight hours in 0.2-2% H2SO4 or HCl). According to Merck Index published in 2006 (Dextrin Monograph No. 2953), white dextrin has a solubility range of 5% to 90%. White dextrin has lower water solubility and viscosity than yellow dextrin or British gum. Preferred white dextrin for the hybrid expandable composition has a solubility rage from about 25% to about 75%.

The starch may be a native starch and/or a modified starch. Native starches may be selected from corn, potato, rice, tapioca, or any other starch sources. Modified starch is prepared by chemical, physical or enzymatic modification of a particular starch.

The microspheres may be pre-expanded or expandable microspheres in the hybrid expandable composition. The pre-expanded microspheres are fully expanded and do not need to undergo further expansion. The hybrid expandable microspheres useful in the present invention should be capable of expanding in size in the presence of heat and/or radiation energy (including, for example, microwave, infrared, radiofrequency, and/or ultrasonic energy). The microspheres useful in the present invention include, for example, heat expandable polymeric microspheres, having a natural, semi-synthetic or synthetic shell with hydrocarbon core. Preferred expandable microspheres include a hydrocarbon core and a polyacrylonitrile and/or polyacrylate shell (such as those sold under the trade name Dualite®) and other similar microspheres (such as those sold under the trade name Expancel®). The hybrid expandable microspheres may have any unexpanded size, including from about 10 microns to about 30 microns in diameter. In the presence of heat, the hybrid expandable microspheres of the present invention may be capable of increasing in diameter by about 3 times to about 10 times. That is, the diameter of the hybrid expandable microspheres may be expandable from about 300% of the starting diameter to about 1,000% of the starting diameter, and most desirably, the diameter of the hybrid expandable microspheres may be expandable from about 350% to about 600% of the starting diameter. Upon expansion, the microspheres provide a closed cell foam structure to provide loft in the hybrid expandable composition.

The hybrid expandable microspheres have a particular temperature at which they begin to expand and a second temperature at which they have reached maximum expansion. Different grades of microspheres have different expansion temperature ($T_{exp}$) and maximum expansion temperature ($T_{max}$). For example, one particularly useful microsphere has a $T_{exp}$ of about 80° C. and a $T_{max}$ of about 120° C., while another useful microsphere has a $T_{exp}$ of about 135° C. and a $T_{max}$ of about 200° C. While any particular grade of microspheres may be used in the present invention, the $T_{exp}$ and $T_{max}$ of the microspheres should be taken into account when formulating and processing. Desirably, the temperature at which these microspheres begin to expand ($T_{exp}$) is from about 80° C. to about 135° C. The temperature at which the microspheres have reached maximum expansion ($T_{max}$) is desirably from about 120° C. to about 200° C. Although the choice of the particular microspheres and their respective $T_{exp}$ and $T_{max}$ is not critical to the invention, the processing temperatures may be modified depending upon these temperatures.

The water-soluble salt in the hybrid expandable composition is selected from the group consisting of sodium chloride, potassium chloride, sodium nitrate, potassium nitrate, potassium sulphate, ammonium sulphate, and mixtures thereof. Without being bound to any specific theory, salt allows the water in the composition to heat up faster and shortens the time required for the expansion of the composition. When added, from about 0.1 to about 5, preferably from about 0.5 to 3 wt % based on the total weight of the composition, may be used.

The composition may further include one or more defoamer, plasticizer, preservative, surfactant, rheology modifier, filler, pigment, dye, stabilizer, polyvinyl alcohol, humectant, and mixtures thereof. Additives including defoamer, plasticizer, preservative, surfactant, rheology modifier, filler, pigment, dye, stabilizer, polyvinyl alcohol or humectant may be added up to 5 wt %, based on the total weight of the hybrid expandable composition.

In another embodiment, the hybrid expandable composition comprises
    a. about 30 to about 80 wt % of the binder system;
    b. about 1 to about 15 wt % of the microspheres;
    c. about 0.1 to about 5 wt % of the water-soluble salt; and
    d. up to about 5 wt % of an additive.

Depending on the binder system, the hybrid expandable composition has a tack on substrate when wet. In addition, the hybrid expandable composition maintains tack onto the substrate upon expansion. While strong adhesion is not necessary, remaining onto the substrate for prolonged time to provide insulation and cushioning is desired. A skilled artisan may modify the adhesion level to increase or decrease tack onto a particular substrate.

A method of forming a hybrid expandable material also provided. In this method, forming a hybrid expandable material comprises the step of:
    a. preparing the hybrid expandable composition as described above;
    b. applying the hybrid expandable composition onto a substrate;
    c. subjecting the hybrid expandable composition to rapid heating;
    d. cooling the hybrid expandable composition.

The composition may be prepared immediately prior to forming, or it may be prepared in advance and stored until needed.

The hybrid expandable composition may be applied onto a substrate in any configuration desired, including in a series of dots, stripes, waves, checkerboard patterns, any general polyhedron shapes that have substantially flat bases, and combinations thereof. Further, the hybrid expandable composition may be applied to the first surface in a series of cylinders. In addition, if desired, the hybrid expandable composition may be applied to the entire substrate. Optionally, a second substrate may be applied to the top surface of the hybrid expandable composition, forming a sandwiched configuration of: first substrate—expandable composition—second substrate. In another embodiment, multiple substrates may be utilized to form a multilayered article to provide enhanced insulation and cushioning. For articles having greater than two substrates, the hybrid expandable composition may be applied in an offset pattern from the previous substrate (configuration of the pattern on each substrate is offset from the configuration below and above) to provide strength to the article. The substrate may be a cellulosic substrate, wood or plastic film having a melting point greater than about 100° C. It is particularly preferred the substrate is a fiberboard, chipboards, corrugated board, corrugated mediums, solid bleached boards, solid bleached sulphite boards, solid unbleached board, white lined chipboards, kraft paper, kraft boards, binder boards, coated paper. Alternatively, the substrate may be an oriented polypropylene film, CELLOPHANE, polyester film, polypropylene film, polyethylene film, metalized film, compostable polymer film, biodegradable polymer film, or bio-based film. In addition, the substrate may be substantially planar or non-planer, e.g., medium typically found in corrugating substrate.

Rapid heating is required for foaming the hybrid expandable composition, including microwave, infrared, radiofrequency, and/or ultrasonic energy heating. Rapid heating provides the open cell structure from the binders in the expandable composition. The maximum heating temperature should not be greater than about 30° F. higher than the $T_{max}$ of the hybrid expandable microspheres, if used in the composition. Temperatures much greater than about 30° F. higher than the $T_{max}$ will rupture the microsphere.

The hybrid expandable composition, upon foaming, is characterized as having closed cell structure and open cell structure. The closed cell structures are from the microspheres and the open cell structures are generated from the binder system. The binder mixture of the emulsion polymer binder with starch or dextrin provide these open cell structures. While not bound to any particular theory, rapid heating of the starch or dextrin combined with space created by the microspheres, and in further combination with resiliency from the emulsion polymer, allows the composition to create higher loft, or expansion of the hybrid expandable system. A combination of both closed cell and open cell structures provide a synergy of higher expansion. While higher loading of microspheres could provide similar expansion, a limit of loading occurs when the binder polymers fail to fill the gaps between the expanded spheres. Moreover, such system becomes too frail and fails to provide protective insulation (padding) and cushioning. A system without any microspheres fails to provide significant loft. In addition, this particular synergistic foamed system provides resiliency and maintains the closed and open cell structures even when pressure is applied.

As the hybrid expandable material cools, the closed cell structures and open cell structures set. During this cooling phase, substrate height may be standardized by applying pressure onto the substrate. This will provide consistent height of the expanded materials throughout the entire substrate.

It has been discovered that the hybrid expandable composition of the present invention is capable of providing the necessary protective insulation and cushioning required in packages and containers. Adhesives and coatings may be applied onto the substrates to form the desired packages and containers. The adhesives may be applied at the edges of the substrates, continuously or discontinuously, to seal the packages and containers. In another embodiment, the adhesives may be applied selectively on non-edge portions to hold the substrates together. The packages and containers may be formed as envelopes, pouch, bags, boxes, cartons, cases, lids, wraps, clamshells, cup, food containers, and the like.

In one embodiment, the package is formed with the hybrid expandable composition interspersed between two substrates in a non-continuous pattern. For example, an adhesive may be applied to the edges of one substrate to hold the two substrates together to form a planar article. A second single planar article may then be adhered with the same or a different adhesive onto ¾ sides to form a pouch. Alternatively, the single planar article may be folded at one seam, and the other two edges may be sealed together with the same of a different adhesive to form a pouch. It is also envisioned a pressure sensitive adhesive strip may be attached at the last remaining edge to seal the package. In one embodiment, the last edge may be formed as a flap with a pressure sensitive adhesive applied on the flap. The pressure sensitive adhesive may have a liner cover, and this liner cover may be removed at a later point to close and seal the flap. The planar article, containing the hybrid expandable material may be the basis to form articles including envelopes, bags, boxes, cartons, cases, lids, wraps, clamshells, cup, and food containers with adhesive. Alternatively, these articles may first be shaped, and then the hybrid expandable composition and adhesives may be employed and expanded to form the desired article.

The above-mentioned adhesives may be also made from renewable or compostable, or biodegradable materials to further decrease the carbon footprint. Both hot melt adhesives and waterborne adhesives are envisioned since they can be processed at the same time as the hybrid expandable composition. As the hybrid expandable composition is expanded during rapid heating, the hot melt adhesives and waterborne adhesives set and bonds substrates together.

Due to heating inconsistencies in a domestic microwave oven, some of the expanded foams may be not symmetrical. The height of the "expanded sandwich" can be measured and used as a guide to the degree of expansion. However, height alone cannot be used solely to judge the degree of expansion of the hybrid composition, and other factors such as percent solids, viscosities, expansion ratio, foam loss and foam resiliency are utilized to evaluate the foamed materials.

desired values. Foam height is the initial height after the expandable composition is rapidly heated and dried. It is desirable for the initial foam height to be high. Initial force is the resistance of the foamed material to compression. Higher the initial force, the stronger the foamed materials to resist compression. Foam loss is the reduction of initial foam height after repeated compression cycles. Low foam loss desirable since this signifies better recovery from the repeated compression cycles. Slope is obtained from a semi-log fitting of the compression peak forces decline over a 5-cycle resilience test. Lower slope indicates that the foams will recover from repeated compressions.

| Factor | preferred | More preferred | More preferred |
|---|---|---|---|
| Foam Height (mm) | >3.5 | >4 | >5 with 50 mg dot mass |
| Initial force (g) | >100 | >150 | >200 to be reasonably strong |
| Foam Loss (mm) | <0.8 | <0.7 | <0.6 to maintain thickness |
| slope, absolute | <100 | <80 | <50 to have better recovery |

The present invention may be better understood through analysis of the following examples, which are non-limiting and are intended only to help explain the invention.

EXAMPLES

Example 1—Formation of Samples

The following samples were made by combining the component in the following order in a vessel at room temperature and mixed with an overhead paddle mixer at around 300 rpm: water, salt, microspheres, binder system in the order of the lowest viscosity to the highest, and then additives. The components to each sample are shown in Table 1.

TABLE 1

| | Com A | Com B | Com C | 1 | 2 | 3 | 4 | 5 |
|---|---|---|---|---|---|---|---|---|
| salt | 1.50 | 1.50 | 1.00 | 2.00 | 2.00 | 2.00 | 2.00 | 2.00 |
| polyvinyl alcohol stabilized vinyl acetate ethylene copolymer emulsion (Tg −15 C.) | 36.50 | | 60.00 | 47.00 | 50.75 | 48.75 | 47.00 | 47.00 |
| carboxylated, poly(vinyl alcohol) stabilized, vinyl acetate-ethylene) (Tg −20 C.) | 13.75 | | 29.75 | | | | | |
| dibenzoate plasticizer | | | | 2.00 | | | 2.00 | 2.00 |
| Native corn starch | 14.00 | 22.50 | | | 9.00 | 14.00 | | |
| Chemically modified waxy corn starch | | | | 25.00 | 14.00 | | | |
| Tapioca starch | | | | | | | | 25.00 |
| high amylose corn starch | | | | | | | 25.00 | |
| White dextrin, 60% cold water solubility | 14.00 | 22.50 | | | | 11.00 | | |
| biocide | 0.10 | 0.10 | 0.10 | | 0.10 | 0.10 | 0.10 | 0.10 |
| defoamer | 0.15 | 0.15 | 0.15 | | 0.15 | 0.15 | 0.15 | 0.15 |
| water | 20.00 | 49.25 | 5.00 | 20.00 | 20.00 | 20.00 | 20.00 | 20.00 |
| microspheres having a $T_{exp}$ at 80-95° C. and $T_{max}$ 120-135° C. | 0.00 | 4.00 | 4.00 | 4.00 | 4.00 | 4.00 | 4.00 | 4.00 |

Foam resiliency is a four-factor evaluation of the foam and its recovery ability after repeated compressions. The four factors are initial compression force, initial foam height, foam height loss (indentation), and slope of force decline. As such, resilience properties are not representative of a single quantitative number, but a four-pronged method to determine the most resilient expanded foams, and the

Example 2—Performance Properties of Samples

For each sample, percent solids, viscosities, expansion ratio, slope, initial force, foam height, foam loss and resilience test cycles were measured and listed in Table 2.

TABLE 2

| Properties | Com A | Com B | Com C | 1 | 2 | 3 | 4 | 5 |
|---|---|---|---|---|---|---|---|---|
| Solids % | 53.9 | 44.3 | 53.5 | 54.4 | 53.0 | 57.5 | 54.4 | 54.4 |
| Viscosity (Pas): 25° C., 0.1 s$^{-1}$ | | 54.9 | 81.7 | 6.1 | 24.6 | 350 | 4.9 | 0.5 |
| Viscosity (Pas): 25° C., 100 s$^{-1}$ | | 1.4 | 0.53 | 1.7 | 1.8 | 1.3 | 1.9 | 0.35 |
| Expansion Ratio, volumetric | 1.2 | 10.4 | 10.1 | 12.6 | 9.4 | 11.4 | 8.0 | 7.7 |
| Foam resiliency | | | | | | | | |
| Foam Height (mm) | 0.9 | 3.9 | 2.9 | 4.6 | 5.3 | 5.0 | 4.8 | 5 |
| Initial force (g) | | 885 | 1364 | 683 | 408 | 298 | 390 | 529 |
| Foam Loss (mm) | NA | 0.9 | 1.1 | 0.6 | 0.7 | 0.5 | 0.4 | 0.4 |
| Slope, absolute | | 121 | 131 | 75 | 42 | 28 | 38 | 47 |
| Resilience Test Cycle # vs. peak force | | | | | | | | |
| 1 | NA | 885 | 1364 | 683 | 408 | 298 | 390 | 529 |
| 2 | NA | 794 | 1269 | 620 | 374 | 274 | 357 | 489 |
| 3 | NA | 745 | 1215 | 592 | 358 | 264 | 343 | 472 |
| 4 | NA | 714 | 1180 | 575 | 348 | 257 | 335 | 461 |
| 5 | NA | 690 | 1155 | 562 | 341 | 252 | 328 | 454 |

Percent solids was measured by weighing about 1.0 ml of sample in a pre-weighed pan on an analytical balance, and then placing it in a 130° C. oven for 30 minutes. The sample was re-weighed after drying and the percent solids was calculated and reported in Table 2.

Shear viscosity of the sample was measured on ARES-Fluid rheometer with 2.5 cm diameter parallel plates at 25° C. A drop of sample was placed on the geometry and the gap was set to around 0.2 mm so the liquid sample just filled between the plates. Shear rate sweep was performed from 0.01 s$^{-1}$ to 1000 s$^{-1}$, and two data points at 0.1 s$^{-1}$ and 100 s$^{-1}$ were taken from the data set and reported in Table 2.

The foam height is the height of the sample after it has been expanded. A known mass of expandable sample, normally 20 to 100 milligrams, was placed on thin glass coverslip as a semispherical dot/drop and placed in a 1 kW household microwave oven directly on the turntable near the edge above the ring track. This was then heated for 10 seconds at full power. The semispherical dot expands to a symmetric "mushroom cap" or very close to it. The freshly expanded foam will still contain moisture upon expansion, so it is left to dry or set. The side view of the dry foam was then photographed with a reference of known width and the profile is digitized with Image Analysis software (ImageJ or Fiji) to enable the determination of the height and volume of the foam.

Figure 1B:
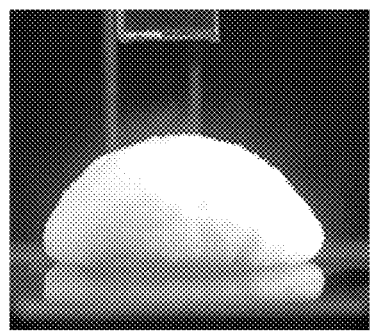
FIG. 1B is a side view photograph of expanded Sample 3.

FIG. 1 is a side view of Sample 3. FIG. 1A is unexpanded wet Sample 3 and FIG. 1B is expanded and dried Sample 3.

The Expansion Ratio is the volume of expanded dry foam divided by the volume of liquid sample. A sample size of 20 to 100 milligrams, was used to form the expanded foam dot height to about 4 and 8 mm with the microwave oven, as described above. Since the wet density of the sample is known, the wet volume was calculated, and therefore, the expansion ratio was obtained. Alternatively, the side profile of the wet drop was photographed and digitized to work out the wet volume.

To measure initial force, foam loss and slope, five resilience test cycles were conducted. These measurements were conducted on Texture Analyzer (model TA.XPlus) with a parallel platen setup. A dedicated procedure was programmed with the Texture Analyzer software and the test was automatically carried out by computer. First the top plate/probe was positioned at 10 mm above the bottom plate.

Figure 2:
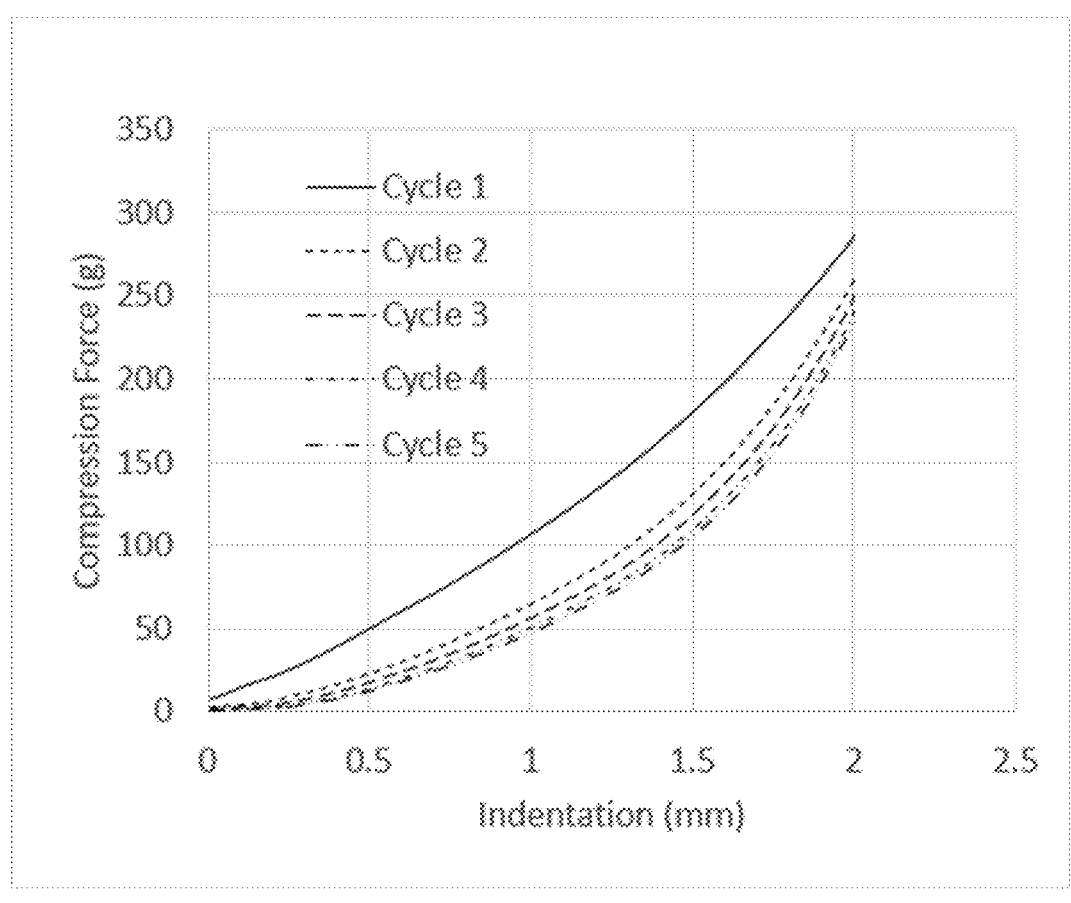
FIG. 2 is force (g) vs. indentation (mm) graph of Sample 3 resilience test.

A sandwich sample, having a configuration of paper-expanded sample-paper (expanded as described with a microwave oven as above), was then placed between the plates. The top plate was then moved slowly towards the sandwich until a 10 gram-force was felt by the force transducer. At that point the top plate stops and its position was recorded by the program so the sandwich thickness (initial foam height) was registered. Then the top plate was backed off by 1 mm away from the top surface of the sandwich. Next the program performs a cycled compression test 5 times. The probe compression speed was 2 mm/s and the compression distance was 3 mm. Since the probe started 1 mm away, the actual compression performed on the sandwich was 2 mm. For the entire time, force, distance, and time was recorded, and the computer program registers the peak compression force at each cycle. The peak force of the first compression cycle was recorded as the initial force. At the fifth cycle, the height of the foam was measured, and the difference between the initial and the final height was calculated and reported as foam loss. Generally, the peak force declines with each cycle and the thickness of the sandwich also declines subsequently. A chart was plotted to show force (g) vs. indentation (mm) for each test cycle. This is shown in FIG. 2 for sample 3.

Figure 3:
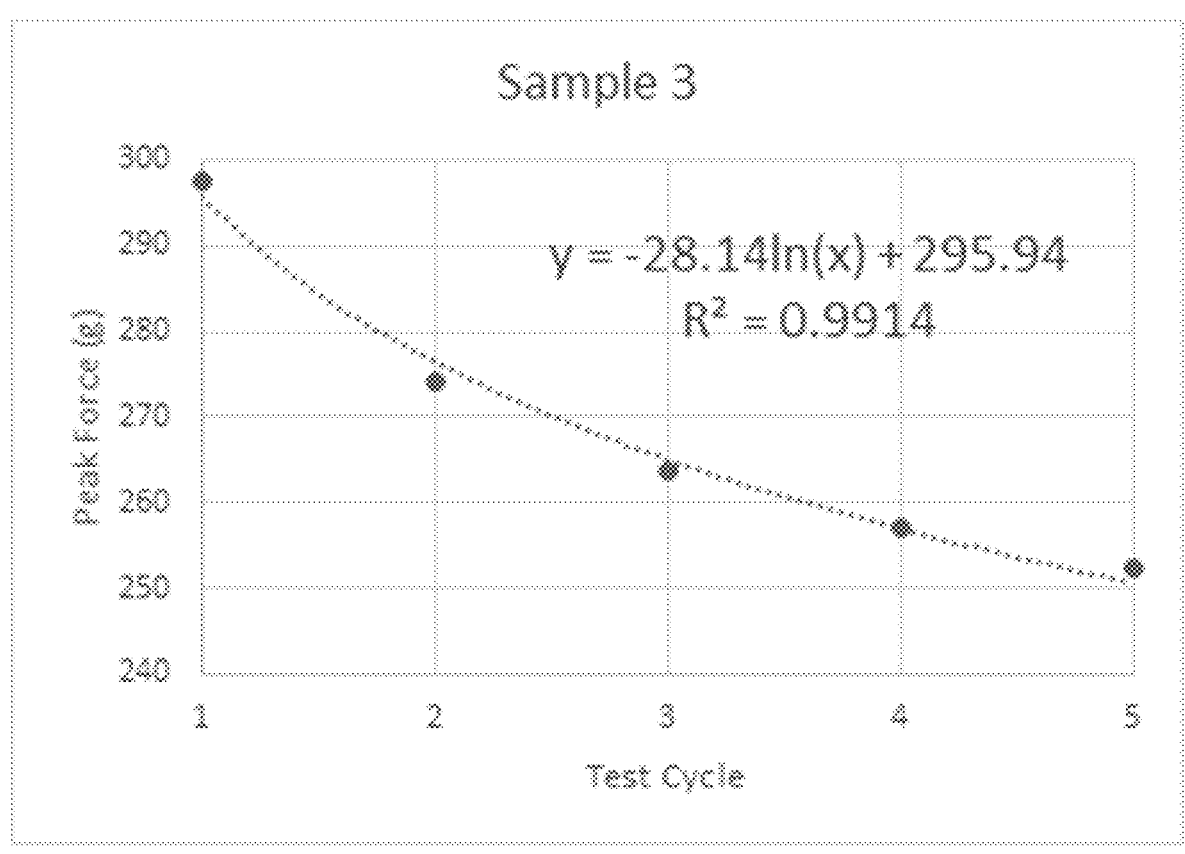
FIG. 3 is a peak force for each resilience test for Sample 3.

To determine the slope, peak force for each test cycle was plotted against the cycle number, and was fitted with a semi-logarithmic decline function. The slope (absolute) was extracted for analysis, and this is shown in FIG. 3.

Figure 4A:
FIG. 4A is a top view photograph of expanded Comparative Sample with 20% microspheres.
Figure 4B:
FIG. 4B is a top view photograph of expanded Sample 3.

FIG. 4 is a top view of expanded samples that have been torn open, photographed with a DSLR Nikon camera fitted with a 40 mm micro-Nikkor DX lens at close range. The photographed sample of FIG. 4A was made with 70% polyvinyl alcohol, 20% microsphere, 1% salt, 2% water, and 7% additives. FIG. 4B was Sample 3. Even with only 4% microspheres, both samples contain similar air void content.

Figure 5A:
FIG. 5A is a side view photograph of expanded Comparative Sample with 20% microspheres.
Figure 5B:
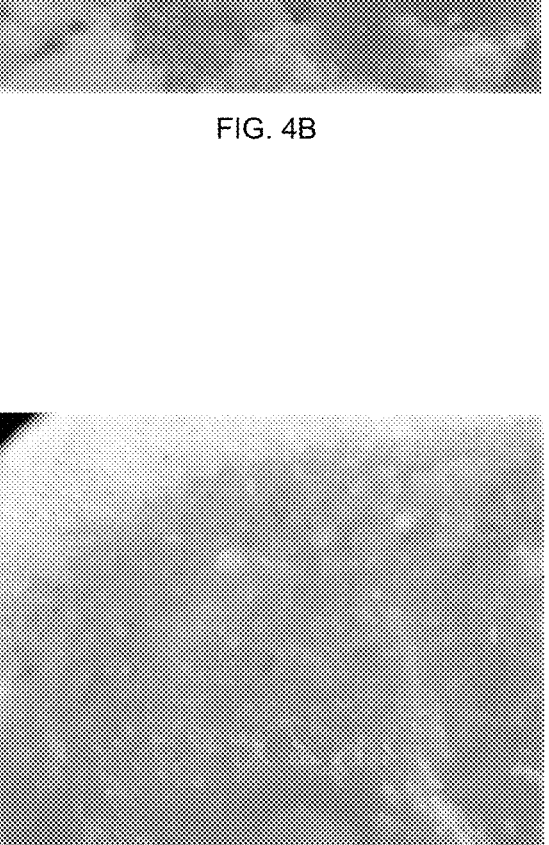
FIG. 5B is a side view photograph of expanded Sample 3.

FIG. 5 is a side view of the same samples of FIG. 4. From the side view, both pictures show similar voids, even though Sample 3 has only 4% microspheres. Also, there are more visible open celled structures in FIG. 5B than 5A.

Foam height increases with the addition of microspheres in starch/dextrin (Comparative Sample B), and also in emulsion polymer (Comparative Sample C). However, foam height becomes significantly increased when both are mixed as the binder system (Samples 1-5). Importantly, the foam loss becomes less when both are mixed as the binder system. The use of the combined binder system also provides lower slope and better resilience.

What is claimed is:

1. A hybrid expandable composition comprising:
   a. a binder system comprising a mixture of (i) a polyvinyl alcohol stabilized vinyl acetate ethylene emulsion polymer binder having a Tg range from about −35° C. to about −5° C. and (ii) a starch or a dextrin;
   c. a plurality of pre-expanded or expandable microspheres;
   d. a defoamer; and
   e. a water-soluble salt.

2. The hybrid expandable composition of claim 1, wherein the starch is a native starch or a modified starch.

3. The hybrid expandable composition of claim 1, wherein the dextrin has a water solubility range of about 25% to about 75%.

4. The hybrid expandable composition of claim 1, wherein the microspheres have shells prepared from natural, semi-synthetic or synthetic polymers.

5. The hybrid expandable composition of claim 4, wherein the microspheres are expandable microsphere having a hydrocarbon core and a polyacrylonitrile and/or polyacrylate shell.

6. The hybrid expandable composition of claim 4, wherein the microspheres having an onset expandable temperature of about 80° C. to about 120° C.

7. The hybrid expandable composition of claim 1, wherein the water-soluble salt is selected from the group consisting of sodium chloride, potassium chloride, sodium nitrate, potassium nitrate, potassium sulphate, ammonium sulphate, and mixtures thereof.

8. The hybrid expandable composition of claim 1, further comprising a plasticizer, preservative, surfactant, rheology modifier, filler, pigment, dye, stabilizer, polyvinyl alcohol, humectant, and mixtures thereof.

9. The hybrid expandable composition of claim 1 comprising:
   a. about 30 to about 80 wt % of the binder system;
   c. about 1 to about 15 wt % of the microspheres;
   d. about 0.1 to about 5 wt % of the water-soluble salt;
   e. up to about 5 wt % of the defoamer.

10. The hybrid expandable composition of claim 1, wherein the binder system has a shear viscosity greater than about 20,000 cps measured with a rheometer at 25° C. at 0.1 s$^{-1}$ and a viscosity of less than about 2,000 cps measured with a rheometer at 25° C. at 100 s$^{-1}$.

11. An article comprising the hybrid expandable composition of claim 1 and at least one substrate.

12. The article of claim 11, wherein the substrate is cellulosic substrate, wood or plastic film having a melting point greater than about 100° C.

13. The article of claim 12, wherein the cellulosic substrate is a fiberboard, corrugated board, solid bleached boards, kraft paper or coated paper.

14. The article of claim 11, which is a cup, food container, case, carton, bag, box, lids, package, envelope, wrap or clamshell.

15. A hybrid expandable material prepared from a hybrid expandable composition comprising:
   a. about 30 to about 80 wt % of a binder system, which is a mixture of (1) a polyvinyl alcohol stabilized vinyl acetate ethylene emulsion polymer binder having a Tg range from about −35° C. to about −5° C. and (2) a starch or a dextrin;
   c. about 1 to about 15 wt % of a plurality of microspheres;
   d. about 0.1 to about 5 wt % of a water-soluble salt; and
   e. up to about 5 wt % of a defoamer;
wherein the hybrid expandable material is characterized as having closed cell structure and open cell structure.

16. A method of forming a hybrid expandable material comprising the step of:
   a. preparing a hybrid expandable composition comprising:
      (i) about 30 to about 80 wt % of a binder system, which is a mixture of (1) a polyvinyl alcohol stabilized vinyl acetate ethylene emulsion polymer binder having a Tg range from about −35° C. to about −5° C. and (2) a starch or a dextrin;
      (ii) about 1 to about 15 wt % of a plurality of microspheres;
      (iv) about 0.1 to about 5 wt % of a water-soluble salt; and
      (v) up to about 5 wt % of a defoamer;
   b. applying the hybrid expandable composition onto a substrate;
   c. subjecting the hybrid expandable composition to rapid heating;
   d. cooling the hybrid expandable composition;
whereby the hybrid expandable material is formed.

17. The method of claim 16, wherein the step b is applied in a configuration selected from the group consisting of dots, stripes, waves, checkerboard patterns, any general polyhedron shapes that have substantially flat bases, cylinders, and combinations thereof.

18. The method of claim 16, wherein the step c is conducted with microwave, infrared, radiofrequency, and/or ultrasonic energy.

19. The method of claim 16, wherein the step d is conducted with pressure to provide a specific height to the hybrid expandable material.

* * * * *